Patented Dec. 31, 1929

1,741,786

UNITED STATES PATENT OFFICE

ISRAEL MAGAT, OF BERLIN, GERMANY, ASSIGNOR TO CHEMISCHE FABRIK GRÜNAU LANDSHOFF & MEYER AKTIENGESELLSCHAFT, OF BERLIN, GERMANY

PROCESS OF PREPARING MEDICINES

No Drawing. Application filed September 1, 1925, Serial No. 53,945, and in Germany October 23, 1924.

The object of the invention is a process of preparing a medicine which has proved of the greatest benefit in the enrichment of the blood with red corpuscles as well as in the cure of pernicious anemia and generally spoken in the promotion of the regenerative and synthetic processes of the human and animal organism.

The invention consists in adding to an emulsion of lecithine a small quantity of glycerine. After a good stirring of the mixture an addition of a very small amount of a mixture of electrolytes is made. That mixture of electrolytes substantially consists of sodium chloride, potassium chloride and calcium chloride, to which a very small amount of sodium carbonate and bicarbonate may be added.

Whereas the mixture of lecithine and glycerine even if mixed with three times its quantity of water presents the consistency of a viscous liquid, the addition of a very small amount of electrolytes has the surprising effect, that the viscosity and surface-tension of the liquid is diminished by more than one half and nearly approaches that of pure water, so that the liquid can be injected into the body without any difficulty.

Experiments have proved that if the aqueous emulsion of lecithine and glycerine after the addition of very small quantities of electrolytes be injected intravenously or subcutaneously into the organism, after a short period an increase of the weight of the human or animal body is observed, caused by an increase of fat and albumen in the serum. As above mentioned, a surprising effect on the blood-forming organs is also observed, so that after a repeated intravenous injection a considerable increase of the red blood corpuscles can be established.

There is a characteristic feature in the composition of the said emulsion in that it allows the introduction of lecithine in the human organism without the appearance of poisoning, which otherwise takes place owing to the decomposition of lecithine. I have ascertained that after a repeated injection of the said emulsion there was an increase of the red blood corpuscles up to 60–100%, the composition of the blood remaining constant after some time. I have also observed that after a repeated injection of the said emulsion into the body of rabbits an increase of the animal weight up to about 50 to 60% took place, which was not lost after the termination of the treatment. A similar increase of the weight could be observed with other animals.

I may add that according to the effects desired I may vary the quantities of the electrolytes and their proportion among its constituents.

Example

I emulgate 1 part of ovo-lecithine with 10 parts of water, until the emulsion is absolutely uniform. I then add stirring all the while 2 parts of glycerine and 0.06 parts of an electrolyte consisting of a mixture of about equal parts of sodium chloride, potassium chloride and calcium chloride, to which a very small quantity of sodium carbonate or bicarbonate may have been previously added. If the emulsion is to be injected subcutaneously a small addition of magnesium chloride is advisable.

I can also combine the above medical preparation with hormonic substances, extracted from endocrinic glands, for instance with insulin, thyroidin, adrenalin, hypophysin, ovarian and the like. Hereby I can obtain medical effects in different directions.

What I claim is:—

1. The herein described process of preparing a medicine for promoting the regenerative and synthetic processes in human and animal organisms, which process consists in forming an emulsion of lecithine and glycerine and adding thereto sodium chloride, potassium chloride and calcium chloride in sufficient in quantities to precipitate the lecithine.

2. The herein described process of preparing a medicine for promoting the regenerative and synthetic processes in human and animal organisms which process consists in forming an emulsion of lecithine and glycerine and adding thereto sodium chloride, potassium chloride, calcium chloride, sodium carbonate and sodium bicarbonate insufficient in quantities to precipitate the lecithine.

3. A composition of matter for use as a medicine comprising lecithine, glycerine, sodium chloride, potassium chloride and calcium chloride, said chlorides being insufficient in quantities to precipitate the lecithine, substantially as described.

4. A composition of matter for use as a medicine, comprising lecithine, glycerine, sodium chloride, potassium chloride, calcium chloride, sodium carbonate and sodium bicarbonate, said chlorides and carbonates being insufficient in quantities to precipitate the lecithine, substantially as described.

In testimony whereof I affix my signature.

ISRAEL MAGAT.